United States Patent
Hwang

(10) Patent No.: US 6,514,586 B1
(45) Date of Patent: Feb. 4, 2003

(54) HOT STAMPING FOIL

(76) Inventor: Kun Lee Hwang, 193-87, Jangchoong-Dong 2GA, Joong-Ku, Seoul (KR)

( * ) Notice: Subject to any disclaimer, the term of this patent is extended or adjusted under 35 U.S.C. 154(b) by 0 days.

(21) Appl. No.: 09/384,772

(22) Filed: Aug. 27, 1999

(30) Foreign Application Priority Data

Aug. 28, 1998 (KR) ............................................. 98-16183

(51) Int. Cl.[7] ................................................ B32B 27/08
(52) U.S. Cl. .................... 428/40.1; 428/40.2; 428/40.4; 428/41.1; 428/41.2; 428/41.8; 428/42.1
(58) Field of Search ................................ 428/40.2, 40.4, 428/41.1, 41.2, 41.5, 41.6, 41.8, 42.1, 42.3, 344, 346, 347, 349, 354, 195, 202

(56) References Cited

U.S. PATENT DOCUMENTS

| | | | |
|---|---|---|---|
| 4,664,966 A | * 5/1987 | Bailey et al. | 428/203 |
| 5,393,590 A | 2/1995 | Caspari | |
| 5,620,775 A | * 4/1997 | LaPerre | 428/149 |
| 5,708,047 A | * 1/1998 | Kamen et al. | 522/31 |
| 5,731,064 A | 3/1998 | Suss | |
| 5,733,638 A | 3/1998 | Tsukioka | |
| 5,977,263 A | * 11/1999 | Phillips | 525/329.9 |

* cited by examiner

Primary Examiner—Robert Dawson
Assistant Examiner—Christopher M. Keehan
(74) Attorney, Agent, or Firm—Steve Cha; Cha & Reiter

(57) ABSTRACT

A hot stamping foil comprising a heat-resistant, flexible carrier sheet of a synthetic resinous material; a release layer of a heat-resistant, flexible synthetic resinous material provided on the carrier sheet and having a lower melting point than the carrier sheet; a laninar assembly having a glass bead layer on the release layer, an aluminum layer on the glass bead layer and an adhesive layer on the aluminum layer; and wherein heat and pressure applied to the cater sheet causes the laminar assembly to be released from the release layer.

8 Claims, 2 Drawing Sheets

HOT STAMPING FOIL

FIELD OF THE INVENTION

The present invention relates to a hot stamping foil in the form of tape or web, and more particularly relates to a hot stamping foil in which a desired design such as figures and letters which is embossed in a die is obtained through hot stamp transfer of the portions pressed by the die from the hot stamping foil onto a worksheet.

BACKGROUND OF THE INVENTION

Various types of hot stamping materials for forming desired designs or decorations by hot stamp transfer are well known in the prior art. These conventional hot stamping materials are generally provided with a heat transferable layer including a patterned layer and the transferable layer is transferred through hot stamping. The patterning of design is directly preformed on the tape or web.

In other prior art hot stamping materials, several layers including the hot stamping layer are provided over the surface of a sheet such as a tape or film without forming desired patterns or designs therein. A die with embossed designs is used to obtain a desired design using this type of hot stamping material, and in this case, it is hard to accomplish hot stamping with a clear peripheries because of blurred hot stamping at the peripheral edges along the embossed design in the die. Therefore, hot stamping is carried out utilizing designs or letters cut off from the hot stamping material in tape or web form.

SUMMARY OF THE INVENTION

An object of the present invention is to provide a hot stamping foil in tape or web form wherein hot stamping operations from the hot stamping foil onto a worksheet such as cloth, leather, and the like are accomplished utilizing a die with a design embossed therein, and wherein clear peripheral edges along the embossed design in the die are also obtained after completion of the hot stamping operations.

Another object of the invention is to provide a hot stamping foil to enhance decorative effects by reflecting rays falling on a heat transferred portion transferred onto a workpieace.

A hot stamping foil according to the present invention comprising:
  a heat-resistant, flexible carrier sheet of a synthetic resinous material.;
  a release layer of a heat-resistant, flexible synthetic resinous material provided on a surface of said carrier sheet and having a lower melting point than said carrier sheet;
  a laminar assembly having a glass bead layer of fine glass beads provided on said release layer and serving as lens, an aluminum layer provided on said glass bead layer and serving as a specular reflecting surface, and an adhesive layer for attaching said glass bead and aluminum layers onto a worksheet after completion of hot stamping operations: and
  wherein when heat and pressure are applied to said carrier sheet through a die with an embossed design therein, only the portions of said laminar assembly which have been pressed by the embossed design are released from said release layer with a clear peripheral edges because of a double structure of said carrier sheet and said release layer, wherein said carrier sheet somewhat absorbs the heat applied thereon so as to prevent said release layer from being stuck to both said die and said laminar assembly due to a meltdown of said release layer, and said release layer holds said laminar assembly as a hole to be stable during the hot stamping process.

DETAILED DESCRIPTION OF THE INVENTION

Figure 1:
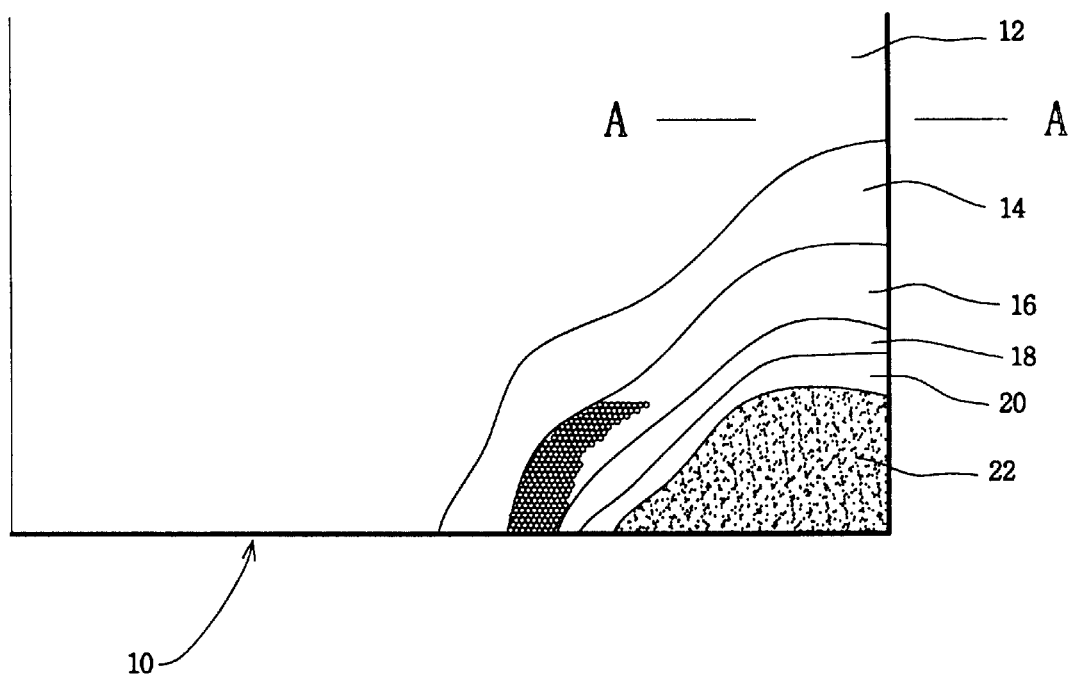
FIG. 1. is a fragmentary top plan view showing layers constituting a sheet-like hot stamping foil according to the present invention.
Figure 2:
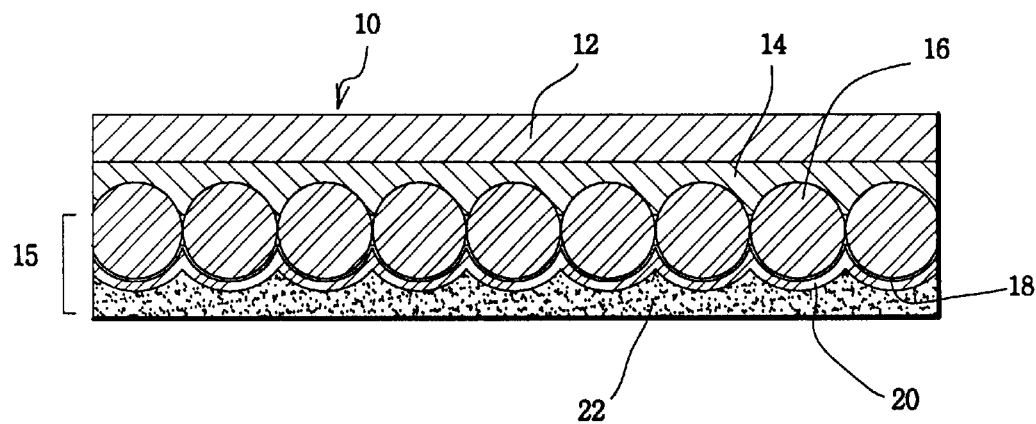
FIG. 2 is an enlarged cross-sectional view taken along line A—A to FIG. 1.

Referring to FIGS. 1 and 2, a hot stamping foil 10 includes a carrier sheet 12 with a release layer 14 provided thereon. A glass bead layer 16 is provided over the release layer 14, and over the glass bead layer, an aluminum layer 20 and an adhesive layer 22 are provided sequentially. A color layer 18 may be provided between the glass bead layer 16 and the aluminum layer 20.

The carrier sheet 12 which is preferably in tape or web form may be a polyester film such as "MYLAR" (trademark of Du Pont) or "VIDENE" (trademark of Goodyear). Suitable films for the release layer 14 are polyethylenes, ethylene vinyl acetate (EVA) or ionomer. Preferred films include "ELVAX" (trademark of Du Pont).

The glass bead layer 16 consisting of fine glass beads is provided over the release layer 14 by a suitable coating means such as a roller. The thickness of the glass bead layer 16 is about 15 to 25 microns and the size of glass beads is about 300 to 400 meshes. The aluminum layer 20 is deposited on the glass bead layer 16 to serve as a specular reflecting surface. A preferred method of deposition of the aluminum layer 20 is through vacuum vapor deposition. Preferably, the aluminum layer 20 is about 0.01 to 0.1 microns thick utilizing aluminum powder of about 300 to 400 meshes. The glass bead and aluminum layers 16 and 20 allow high brightness to be accomplished because of role of the glass bead layer 16 as concave lens and because of role of the aluminum layer 20 as a specular reflecting surface The color layer 18 may be provided between the glass bead layer 16 and the aluminum layer 20 to obtain the hot stamping foil 10 with various colors. The color layer 18 is a pigmented synthetic resins and about 15 to 25 microns thick.

The adhesive layer 22 over the aluminum layer 20 is about 10 to 25 microns thick and a wide range of adhesives may be used as the adhesive layer 20 such as, for example., pressure-sensitive adhesives or thermoplastic adhesives. One example of a suitable adhesive known as "hot tackifying adhesive" is described in U.S. Pat. No. 4.569.877.

When hot stamping operations have been completed using the hot stamping foil 10 of the invention, the laminar assembly 15 consisting of the glass bead, aluminum, and adhesive layers 16, 20, and 22 is released from the release layer 14. At this time, heat applied to the hot stamping foil 10 through a die is dispersed by the carrier sheet 12 and the release layer 14, because of double structure of the carrier sheet and release layer 12 and 14 in which the carrier sheet 12 of polyester film has the higher melting point than the release layer 14 of polyethylene. Namely, the heat applied primarily to the carrier sheet 12 is somewhat absorbed and then is transferred to the release layer 14. This allows the release layer 14 to be thermoplastic and released from the laminar layer 15 in a state of not melting down. The release layer 14 also holds the glass bead layer 16 stable during hot stamping operations, because the release layer 14 is not stuck to the glass bead layer 16. With the double structure of the type illustrated in FIGS. 1 and 2, the degree of dispersion varies by controlling the thickness of the carrier sheet 12 and the release layer 14. It is preferable to utilize an about 30 to 50 microns thick polyester as the carrier sheet 12 and an about 15 to 20 microns thick polyethylene as the release layer 14, considering increase of heating and pressing time in case of using too thick layers.

Figure 3A:
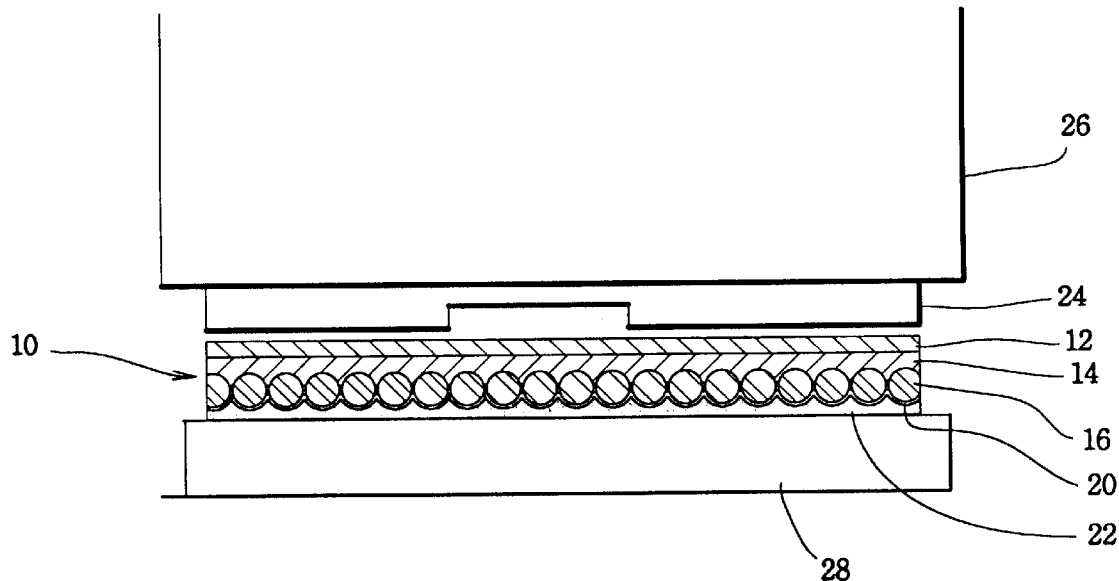
FIG. 3A is a partial enlarged view showing hot stamping operations which are carried out on a worksheet utilizing a press with a die for the hot stamping foil of the invention.
Figure 3B:
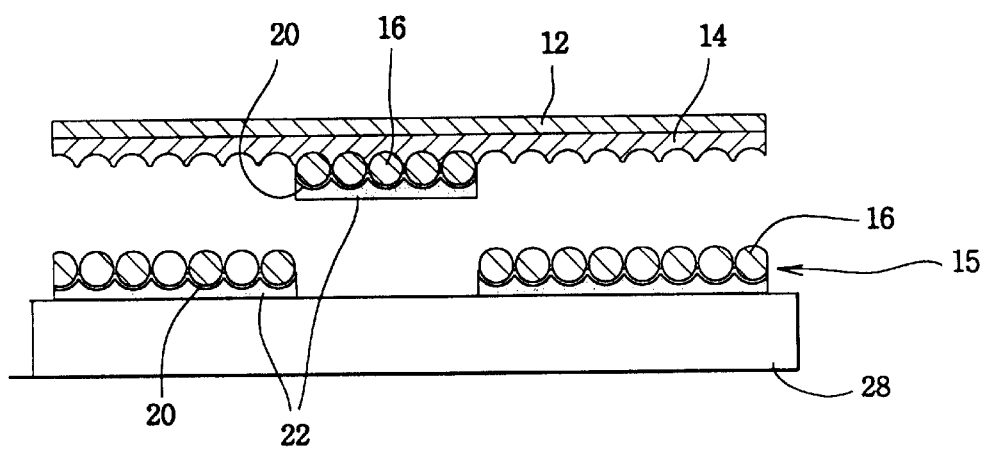
FIG. 3B is a partial enlarged view showing separation between a laminar assembly and carrier sheet and release layers after completion of the hot stamping operations of FIG. 3A, the separation occurring at the embossed portions in the die except depressions therein.

Referring to FIGS. 3A and 3B, which show hot stamping processes using the die 24 mounted in the press 26, the hot stamping foil 10 is put on a worksheet 28. In this state, heat and pressure are applied onto the carrier sheet 12 using the die 24 in the press 26 having heating and pressing means of any suitable type associated therewith. Any desired designs are embossed in the die 24. When pressing the foil 10 for one or more seconds at 170° C., heat transferred to the carrier sheet 12 and release layer 14 allows the clear release between the release layer 14 and the laminar assembly 15 at the embossed portions (designs) to happen so as to obtain the heat transferred design with clear peripheral edges. Simultaneously, the adhesive layer 22 becomes tacky by the heat transferred to the laminar assembly 15 and adheres to the worksheet 28. The heat-transferred material of desired design is obtained by taking off the released carrier sheet 12 and release layer 14. High decorative effects of the heat transferred laminar layer is accomplished because of the light reflection by the glass bead and aluminum layers.

What is claimed is:

1. A hot stamping foil, comprising:
   a heat-resistant, flexible carrier sheet of a synthetic resinous material;
   a release layer of a heat-resistant, flexible synthetic resinous material provided on a surface of said carrier sheet and having a lower melting point than said carrier sheet;
   a laminar assembly having a glass bead layer of fine glass beads provided on said release layer and serving as lens, an aluminum layer provided on said glass bead layer and serving as a specular reflecting surface, and an adhesive layer for attaching said glass bead and aluminum layers onto a worksheet after completion of hot stamping operations; and
   wherein if heat and pressure are applied to said carrier sheet through a die with an embossed design therein, portions of said laminar assembly which have been pressed by the embossed design are released from said release layer with a clear peripheral edges because of a double structure of said carrier sheet and said release layer, wherein said carrier sheet partially absorbs the heat applied thereon so as to allow a clear release between said release layer and said laminar assembly without melting said release layer, thus holding said laminar assembly stable during the hot stamping process.

2. A hot stamping foil according to claim 1, further comprising a color layer of a pigmented synthetic resin provided between said glass bead layer and said aluminum layer.

3. A hot stamping foil according to claim 1, wherein said carrier sheet is a polyester film of about 30 to 50 microns thick, said release layer is a polyethylene film of about 15 to 20 microns thick.

4. A hot stamping foil according to claim 3, wherein the particle size of said glass beads of said glass bead layer and said aluminum layer is about 300 to 400 meshes, respectively, the thickness of said glass bead layer is about 15 to 20 microns, and the thickness of said adhesive layer is about 10 to 25 microns.

5. A hot stamping foil comprising:
   a heat-resistant, flexible carrier sheet of a synthetic resinous material;
   a release, layer of a heat-resistant, flexible synthetic resinous material provided on said carrier sheet and having
   a lower melting point than said carrier sheet;
   a laminar assembly having a glass bead layer on said release layer, an aluminum layer on said glass bead layer and an adhesive layer on said aluminum layer; and
   wherein heat and pressure applied to said carrier sheet allows a clear release between said release layer and said laminar assembly without melting said release layer.

6. A hot stamping foil according to claim 5, further comprising a color layer of a pigmented synthetic resin provided between said glass bead layer and said aluminum layer.

7. A hot stamping foil according to claim 5, wherein said carrier sheet is a polyester film of about 30 to 50 microns thick, said release layer is a polyethylene film of about 15 to 20 microns thick.

8. A hot stamping foil according to claim 5, wherein the particle size of said glass beads of said glass bead layer and said aluminum layer is about 300 to 400 meshes, respectively, the thickness of said glass bead layer is about 15 to 20 microns, and the thickness of said adhesive layer is about 10 to 25 microns.

* * * * *